United States Patent [19]

Narahara et al.

[11] 4,070,416
[45] Jan. 24, 1978

[54] NOVEL THERMOSETTING RESIN AND A PROCESS FOR PRODUCING SAME

[75] Inventors: Toshikazu Narahara; Katuo Sugawara; Yoshiharu Karasawa, all of Hitachi; Hitoshi Yokono, Katsuta; Junji Mukai; Tadashi Muroi, both of Hitachi, all of Japan

[73] Assignee: Hitachi, Ltd., Japan

[21] Appl. No.: 605,324

[22] Filed: Aug. 18, 1975

Related U.S. Application Data

[63] Continuation of Ser. No. 418,905, Nov. 26, 1973, abandoned.

[30] Foreign Application Priority Data

Nov. 29, 1972 Japan ................................ 47-118986

[51] Int. Cl.$^2$ ............................................. C08L 63/00
[52] U.S. Cl. ........................... 260/830 P; 260/47 EN; 260/47 EP; 260/59 EP; 260/77.5 NC
[58] Field of Search ............ 260/47 EN, 59, 77.5 NC, 260/77.5 AM, 77.5 R, 248 R, 830 P, 830 TW

[56] References Cited

U.S. PATENT DOCUMENTS

| 3,020,262 | 2/1962 | Speranza | 260/47 |
| 3,673,128 | 6/1972 | Hayash, Jr. et al. | 260/2.5 |
| 3,793,236 | 2/1974 | Ashida | 260/2.5 |

FOREIGN PATENT DOCUMENTS 1,155,768  6/1969  United Kingdom.

Primary Examiner—Theodore E. Pertilla
Attorney, Agent, or Firm—Craig & Antonelli

[57] ABSTRACT

A novel thermosetting resin can be obtained by mixing 1 equivalent or more of a polyfunctional isocyanate per 1 equivalent of a polyfunctional epoxide and then carrying out a polymerization reaction of the mixture in the presence of the catalyst which forms isocyanurate rings and oxazolidone rings so as to enable the mixture to form 2 or more isocyanurate rings directly connected with oxazolidone rings through an isocyanate residues.

The resulting thermosetting resin has excellent electrical, chemical and impact resistances and excellent self-extinguishing properties. Said resin is used as an electric insulating material.

48 Claims, No Drawings

NOVEL THERMOSETTING RESIN AND A PROCESS FOR PRODUCING SAME

This is a continuation, of application Ser. No. 418,905 filed Nov. 26, 1973 which is now abandoned.

The present invention relates to a novel thermosetting resin. More particularly it pertains to a novel thermosetting resin obtained by a reaction between an epoxide and an isocyanate.

In recent years, there has been demand for thermosetting resins having more excellent heat resistance for electrical appliances, such as rotating machines, according to the increase in capacity and decrease in size and weight thereof. Heretofore, epoxy resin and silicone resin have been known as the thermosetting resins with very excellent heat resistance, however, these resins cannot be used at a temperature of 180° C or more for a long period of time from the synthetic point of view. Therefore, the finding of a thermosetting resin with more excellent heat resistance has been desired. The introduction of heterocycle having imide groups into a resin is known as a method of imparting heat resistance to the resin. The representative resins include an aromatic polyimide, an aromatic polyamide-imide and the like. However, these resins could not be used without using any solvents. Hence, it is unsuitable for use as a varnish for impregnation. It is only used as a sheet-like insulating material, and is also expensive.

As the other resin with excellent heat resistance, there is known polyisocyanurate, but this resin is very hard and bittle, so that it is not put to practical use.

An object of the present invention is to provide a novel thermosetting resin.

Another object of the present invention is to provide a thermosetting resin with tough mechanical properties.

A further object of the present invention is to provide a non-solvent type thermosetting resin.

A still further object of the present invention is to provide an electric insulating material having excellent electrical and mechanical properties and a high thermal stability.

The other object of the present invention will be apparent from the descriptions given below.

The purpose of the present invention is to provide a novel thermosetting resin having as a recurring unit 2 or moe isocyanurate rings connected with an oxazolidone ring or an isocyanurate ring through an isocyanate residue represented by the general formula (1) below. This resin is produced by reacting a polyfunctional epoxide, i.e. an epoxide having 2 or more vicinal epoxy groups, with an organic polyisocyanate or polyfunctional isocyanate as essential components in an amount of 1 equivalent or more of said organic polyisocyanate per 1 equivalent of said polyfunctional epoxide in the presence of a catalyst:

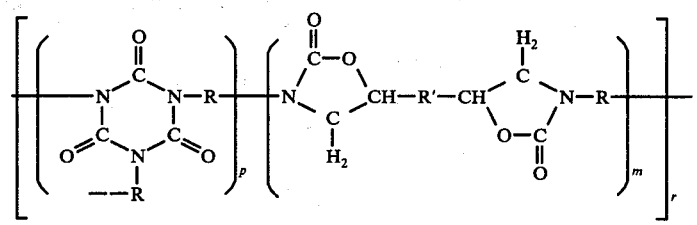

wherein R respresents an isocyanate residue, R' represents an epoxy residue, and $m$ represent an integer of 1 or more, respectively, $p$ represents an integer of 2 or more and $r$ represents an integer of 1 or more.

In the above general formula, when R is trifunctional or more, 3 or more of isocyanurate rings and/or oxazolidone rings are directly connected with R, and when R' is trifunctional or more, 3 or more of oxazolidone rings are directly connected with R'.

With respect to the curing mechanism of the thermosetting resin of the present invention, it is assumed that the reaction could proceed as follows:

When a temperature is about 130° C or lower, isocyanurate bonds should be mainly formed as shown in the formula (2).

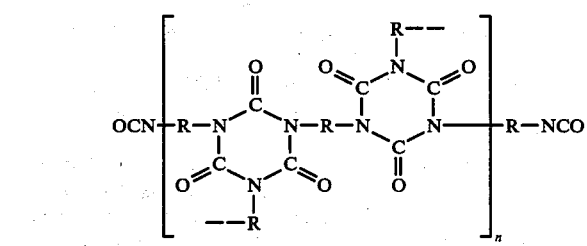

Subsequently, when the temperature reaches more than 130° C, it is assumed that oxazolidone bonds should be formed and that cross-linkings should be achieved three-dimensionally as shown in the formula (3).

(3)

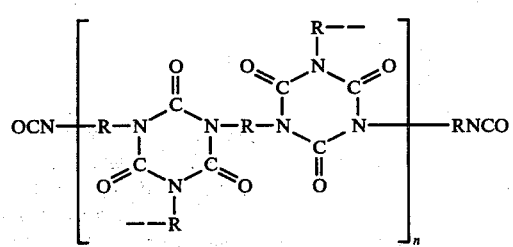

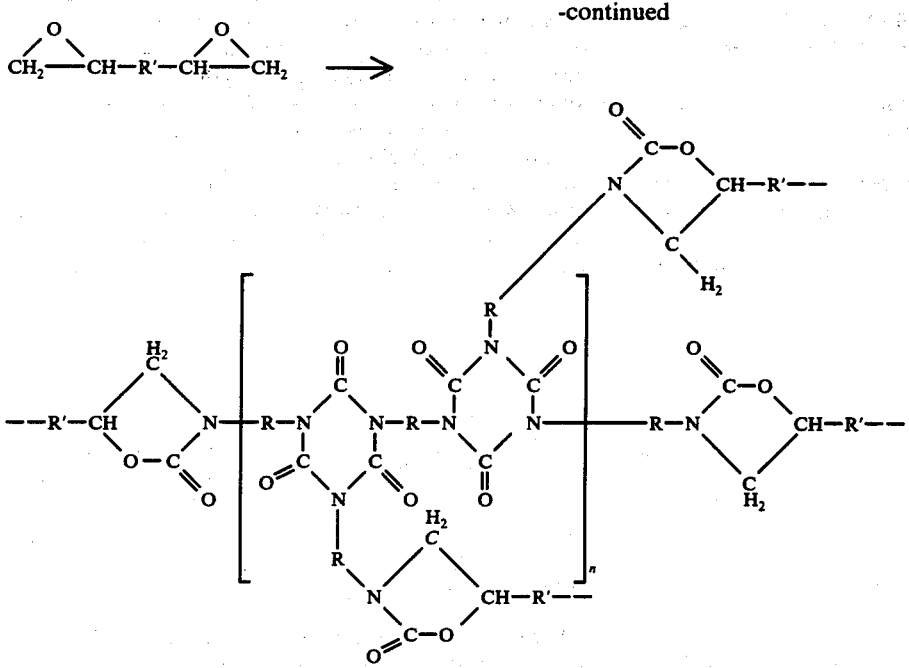

The reason why the cured product of the thermosetting resin of the present invention has particularly excellent mechanical properties and a high thermal stability is that the cured product composed of isocyanurate bonds and oxazolidone bonds which have excellent thermal stability. It is, further, assumed that, since the isocyanurate bond part having a high cross-linking density and the comparatively flexible part based on the epoxide are present together, maintaining an adequate balance between two parts, a cured product with excellent mechanical properties could be obtained. In this respect, it is desirable that the value to be given by $p/m + p$ in the formula (1) is in a range of 0.6 to 0.95.

Further, in the present invention, it is an essential condition to use 1 equivalent or more of polyfunctional isocyanate per 1 equivalent of polyfunctional epoxide. But a monofunctional epoxide or a mono-functional isocyanate can be admixed with the mixture. In this case, however, deterioration inevitably takes place in physical properties, especially heat resistance, of the cured product.

As the polyfunctional epoxide of the present invention, there can be used bifunctional expoxides such as for example, diglycidylether of bisphenol A, butadiene diepoxide, 3,4-epoxycyclohexylmethyl-(3,4-epoxy) cyclohexane carboxylate, vinylcylohexene dioxide, 4,4'-di(1,2-epoxyethyl)diphenylether, 4,4'-di(1,2-epoxyethyl)biphenyl, 2,2-bis(3,4-epoxycyclohexyl)propane, diglycydylether of resorcinol, diglycydylether of phloroglucinol, diglycidylether of methylphloroglucinol, bis(2,3-epoxycyclopentyl)ether, 2-(3,4-epoxy)cyclohexane-5,5-spiro(3,4-epoxy)-cyclohexane-m-dioxane, bis(3,4-epoxy-6-methylcyclohexyl)adipate, N,N'-m-phenylenebis(4,5-epoxy-1,2-cyclohexanedicarboxyimide) and the like; and tri- or more functional epoxy compounds such as triglycydylether of paraminophenol, polyallylglycidylether, 1,3,5-tri(1,2-epoxyethyl)benzene, 2,2',4,4'-tetraglycidoxybenzophenone, tetraglycidoxytetraphenylethane, polyglycidylether of phenol-formaldehyde novolac, triglycidylether of glycerol, triglycydylether of trimethylolpropane and the like. With repsect to the other epoxy compounds, a book entitled "Epoxy Resins" (American Chemical Society, 1970) written by Henry Lee and a book entitled "Handbook of Epoxy Resin" (McGraw Hill Book Co., 1967) written by Henry Lee and K. Neville contain the descriptions of the resins.

Among the aforesaid polyfunctional epoxides, the diglycydylether of bisphenol A and the polyglycydylether of phenol-formaldehyde novolac have a particuallar good reactivity. Therefore they are usuful compounds. Further, the halides of these compounds can be used, too.

Further, as polyisocyanates or polyfunctional organic isocyanates, there can be used bifunctional isocyanates, such as for example, methane diisocyanate, butane-1,1-diisocyanate, ethane-1,2-diisocyanate, butane-1,2-diisocyanate, transvinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethyl-pentane,1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilanediisocyanate, diphenylsilanediisocyanate, ω, ω'-1,3-dimethylbenzenediisocyanate, ω, ω'-1,4-dimethylbenzene diisocyanate,ω, ω'-1,3-dimethylcyclohexane diisocyanate,ω,ω'-1,4-dimethylcyclohexane diisocyanate,ω,ω'-1,4-dimethylbenzene diisocyanate,ω,ω'-1,4-dimethylnaphthalene diisocyanate, ω,ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, naphthalene-1,4-diisocyanate, naphthalene-1,5-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfone-4,4'-diisocyanate and the like; and trifunctional or more isocyanates, such as for example, polymethylenepolyphenylisocyanate, triphenylmethanetriisocyanate, tris(4-phenylisocyanatethiophosphate), 3,3',4,4'-diphenylmehtanetetraisoyanate and the like. Further, compounds obtained by masking isocyanic radicals of the aforesaid isocyanates with phenol, cresol and the like can be used, too. The dimers and trimers of these isocyanates are usable, too. Among these isocyanates, 4,4'-diphenylmethane diisocyanate, 2,4-toluene diisocyanate, naphthalene-3,5-diisocyanate are preferable and useful. The aforesaid epoxides and isocyanates are each used solely or in combination with one another.

It is essential to mix a polyfunctional organic epoxide with a polyfunctional isocyanate in the amount of 1 equivalent or more of the latter per 1 equivalent of the former, but from the stand-point of cross-linking, it is favourable to use the polyfunctional organic isocyanate in the amount of 1.5 equivalents or more.

When the polyfunctional organic isocyanate is used in the amount of 5 equivalents or more, there is a tendency of the properties of the cured product becoming remarkably brittle. Particularly, when the polyfunctional organic isocyanate is used within a range of 2 to 3.5 equivalents, a good result is obtained in the respects of thermal stability and mechanical performance at the temperature of 180° C or higher.

A catalyst displays an important role for obtaining the composition of the present invention. Important is a catalyst which forms isocyanurate bonds and oxazolidone bonds at the time of curing. Such a catalyst as above includes tertiary amines, such as for example, trimethylamine, triethylamine, tetramethylbutanediamine, tetramethylpentanediamine, tetramethylhexanediamine, triethylene diamine and the like; oxyalkylamine, such as for example, dimethylaminoethanol, dimethylamino pentanol and the like; and morpholine derivatives, such as for example, N-dodecyl morpholine, butylene dimorpholine, hexamethylene dimorpholine, cyanoethyl morpholine, triazinoethyl morpholine, N-methyl morpholine, N-ethyl morpholine and the like. Further, there are quaternary ammonium salts containing a long chain alkyl group having 8 or more carbon atoms as a catalyst, such as for example, cetyltrimethyl ammonium bromide, cetyltrimethylammonium chloride, dodecyltrimethyl ammonium iodide, trimethyldodecylammonium chloride, benzyl dimethyltetradecylammonium chloride, benzyldimethyltetradecyl ammonium chloride, benzyldimethylpalmitylammonium chloride, allyldodecyltrimethyl ammonium bromide, benzyldimethylstearyl ammonium bromide, stearyltrimethylammonium chloride, benzyl dimethyltetradecyl ammonium acetylate and the like. Furthermore, there are imidazoles as a catalyst, such as for example, 2-methylimidazole, 2-ethylimidazole, 2-undecylimdazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 2,4-diamino-6(2'-methylimidazolyl-1'-)-ethyl-s-triazone, 2,4-diamino-6-(2'-ethylimidazolyl-1'-)ethyl-s-triazine, 2,4-diamino-6-(2'-undecylimidazolyl-1'-) ethyl-s-triazine and the like. Among the aforesaid catalysts, morpholine derivatives or imidazole derivatives are particularly effective.

At least one of the aforesaid heterocycle forming catalysts is used within a range of 0.01 to 10% by weight, preferably 0.1 to 2% by weight, based on a mixture of said polyfunctional epoxide and polyfunctional isocyanate.

The thermosetting resin, an objective matter of the present invention, can be obtained by mixing said polyfunctional organic epoxide and polyfunctional isocyanate at the mixing ratio according to the object and adding said catalyst to the mixture and then heating the thus obtained mixture.

The aforesaid thermosetting resin composition can be made a non-solvent type, as previously stated, and can be cured with ease only by heating at a temperature ranging from 80° to 250° C or higher. The cured resin has excellent electrical properties, chemical and impact resistances and excellent self-extinguishing properties. Therefore, it has a various application as a heat resistant insulating varnish, a casting resin, an impregnation resin, a molding resin for electrical parts, an adhesive, a resin for lamination board, a resin for printed circuits, a resin for interior material and the like. Said resin can be admixed with various additives, fillers, pigments and the like according to the application.

The present invention is further explained more concretely by way of examples, but this invention shall not be limited to the given examples.

EXAMPLE 1

One hundred grams of diglycidylether of bisphenol A (DER 332 produced by Dow Chemical Co. in the United States; epoxy equivalent: 174, viscosity: 5000 centipois (c.p.) at 25° C, 174 g of 4,4'-diphenylemthanediisocyanate (hereinafer referred to as MDI) and were well mixed. The mixture had a viscosity of 17 centistokes (c.s.) at 40° C. Said mixture was placed in a air-tight vessel and left standing at 40° C for 100 days, but little or no change was seen in viscosity. To said mixture 0.27 gram of N-methylmorpholine was added and then heated at 110° C for 5 hours, at 150° C for 10 hours and further at 225° C for 15 hours to obtain a cured product.

The infrared absorption spectra of the cured product showed that there disappeared an absorption band of carbonyl of —NCO group at 2250 cm$^{-1}$ and an absorption band of epoxy group at 910 cm$^{-1}$ which had been observed before curing, and newly appeared an absorption band at 1710 cm$^{-1}$ based on the isocyanurate bond and an absorption at 1750 cm$^{-1}$ based on the oxazolidone bond. From this it was found that the cured product was a polymer having isocyanurate bonds and oxazolidone bonds. The obtained cured product was a light-brown clear resin and had a weight loss starting temperature of 380° C in a nitrogen atmosphere.

The mechanical and electrical properties of the cured product are as shown in Table 1. From the table, it will be seen that the heat resistance is excellent.

Table 1

| | | Example 1 | Example** |
|---|---|---|---|
| Tensile strength* (kg/cm$^2$) | | 449 | 185 |
| Elongation* (%) | | 6 | 3 |
| Flexural characteristics (25° C) | Strength (kg/cm$^2$) | 1750 | 920 |
| | Distortion (%) | 6.0 | 1.5 |
| | Young's modulus in flexure (kg/cm$^2$) | 4.6 × 10$^4$ | 3.2 × 10$^4$ |
| Electrical | tan δ (%) | 0.9 | 5.1 |

Table 1-continued

| | | Example 1 | Example** |
|---|---|---|---|
| characteristics (200° C) | ε | 3.85 | 3.7 |
| | ρ (Ω cm) | $3 \times 10^{12}$ | $5 \times 10$ |
| Properties after 20 days deterioration at 240° C | Tensile strength (kg/cm²) | 456 | 0 |
| | Elongation* (%) | 4 | 0 |
| | Loss of weight (%) | 3.6 | 13.6 |

*measured at 225° C
**Refer to the description given below.

COMPARATIVE EXAMPLE

One hundred grams of Novolac type polyglycydylether (DEN 438 produced by Dow Chemical Co.; oposy equivalent : 190, viscosity : 50,000 Centipoises/25° C) 66 g of methylenedomethylenetetrahydrophthalic anhydride (MHAC-P produced by Hitachi Chemical Co., Ltd.) and 0.8 g of 2-ethyl-4-methylimidazole (EMI-24 produced by Shell Chemical Co.) were well mixed. The mixture had a viscosity of 4000 c.s. at 25° C. Said mixture was heated at 110° C for 5 hours, at 150° C for 10 hours and further at 225° C for 15 hours to obtain a cured product. The resulting cured product had a weight loss starting temperature of 285° C in a nitrogen atmosphere, and said temperature was about 100° C lower than that of the novel thermosetting resin of the present invention. The mechanical and electrical properties of the cured product are as shown in Table 1. This composition has the highest heat resistance in all the epoxy resins. It will be found how excellent the resin of the present invention is, when compared with the resin of this comparative example.

EXAMPLE 2 – 17

In each Example, 100 g of Novolac type polyglycidylether (DEN 431 produced by Dow Chemical Co.; epoxy equivalent: 175; viscosity: 1500 c.p.), 175 g of MDI and a catalyst shown in Table 2 were well mixed. The mixture had a viscosity of 26 c.s. at 40° C. Said mixture was heated at 110° C for 5 hours, at 150° C for 10 hours and further at 225° C for 15 hours to obtain a cured product. The infrared absorption spectrum of the cured product was the same as in Example 1. The cured product was found to be a polymer having mainly isocyanurate bonds and oxazolidone bonds. The resulting cured product was a light-brown clear resin and had a weight loss starting temperature ranging from 360° to 390° C in a nitrogen atmosphere. Further, the resulting cured product had the same excellent electrical properties as in Example 1. The mechanical properties of the cured product are as shown in Table 3. From the table, it will be seen that the cured product has excellent heat resistance.

Table 2

| Example | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| DEN 431 | 100 | 100 | 100 | 100 | 100 | 100 | 100 | 100 | 100 | 100 | 100 | 100 | 100 | 100 | 100 | 100 |
| MDI | 175 | 175 | 175 | 175 | 175 | 175 | 175 | 175 | 175 | 175 | 175 | 175 | 175 | 175 | 175 | 175 |
| N-methylmorpholine | 0.28 | — | — | — | — | — | — | — | — | — | — | — | — | — | — | — |
| Triethylamine | — | 0.28 | — | — | — | — | — | — | — | — | — | — | — | — | — | — |
| Triethylenediamine | — | — | 0.28 | — | — | — | — | — | — | — | — | — | — | — | — | — |
| Benzalconium chloride | — | — | — | 0.56 | — | — | — | — | — | — | — | — | — | — | — | — |
| Tetramethylpentanediamine | — | — | — | — | 0.28 | — | — | — | — | — | — | — | — | — | — | — |
| Dimethylamino ethanol | — | — | — | — | — | 0.28 | — | — | — | — | — | — | — | — | — | — |
| Dimethylbenzylamine | — | — | — | — | — | — | 0.28 | — | — | — | — | — | — | — | — | — |
| 2-ethyl-4-methylimidazole | — | — | — | — | — | — | — | 0.28 | — | — | — | — | — | — | — | — |
| 1-cyanoethyl-2-phenyl-imidazole | — | — | — | — | — | — | — | — | 1.38 | — | — | — | — | — | — | — |
| 3-Dimethylaminopropylamine | — | — | — | — | — | — | — | — | — | 0.28 | — | — | — | — | — | — |
| 2-Phenyl-imidazole | — | — | — | — | — | — | — | — | — | — | 0.28 | — | — | — | — | — |
| 2-Undecyl-imidazole | — | — | — | — | — | — | — | — | — | — | — | 0.28 | — | — | — | — |
| Triazinoethyl-2-undecyl-imidazole | — | — | — | — | — | — | — | — | — | — | — | — | 0.28 | — | — | — |
| Octylmorpholine | — | — | — | — | — | — | — | — | — | — | — | — | — | 0.28 | — | — |
| Butylenedimorpholine | — | — | — | — | — | — | — | — | — | — | — | — | — | — | 0.28 | — |
| Hexamethylenedimorpholine | — | — | — | — | — | — | — | — | — | — | — | — | — | — | — | 0.28 |

Table 3

| | Example | 2 | 3 | 4 | 5 | 6 | 7 | 8 | 9 | 10 | 11 | 12 | 13 | 15 | 15 | 16 | 17 |
|---|---|---|---|---|---|---|---|---|---|---|---|---|---|---|---|---|---|
| Initial value | Tensile* Strength (kg/cm²) | 409 | 448 | 432 | 405 | 412 | 420 | 430 | 450 | 486 | 427 | 472 | 455 | 460 | 490 | 495 | 488 |
| | Elongation* (%) | 5 | 6 | 6 | 6 | 5 | 6 | 7 | 5 | 6 | 7 | 6 | 5 | 6 | 7 | 7 | 7 |
| Properties after 20 days deterioration at 240° C | Tensile* Strength (kg/cm²) | 373 | 361 | 385 | 307 | 382 | 355 | 370 | 430 | 424 | 302 | 390 | 382 | 361 | 420 | 410 | 405 |
| | Elongation (%) | 4 | 4 | 3 | 4 | 4 | 4 | 4 | 4 | 3 | 3 | 4 | 3 | 4 | 4 | 4 | 4 |
| | Loss of | | | | | | | | | | | | | | | | |

Table 3-continued

| Example | 2 | 3 | 4 | 5 | 6 | 7 | 8 | 9 | 10 | 11 | 12 | 13 | 15 | 15 | 16 | 17 |
|---|---|---|---|---|---|---|---|---|---|---|---|---|---|---|---|---|
| weight (%) measured at an ordinary temperature | 4.1 | 3.9 | 4.0 | 3.6 | 3.9 | 3.5 | 3.4 | 3.9 | 3.5 | 3.5 | 3.8 | 3.9 | 3.6 | 3.2 | 3.2 | 3.1 |

*measured at 225° C.

EXAMPLES 18 – 26

MDI was added in amounts varying from 69 g to 416 g as shown in Table 4 (An equivalent ratio of isocyanate group/epoxy group ranges from 1.5 to 6.0.) to 100 g of diglycydylether of bisphenol A used in Example 1, and further 0.2% by weight of N-methylmorpholine was added thereto, and the mixture was well mixed. Said mixture was heated at 110° C for 5 hours, at 150° C for 10 hours and further at 225° C for 15 hours to obtain the cured product. The results obtained are shown in Table 4.

When the equivalent ratio of isocyanate group/epoxy group exceeded 3.5, some unreacted isocyanate groups remained. When the equivalent ratio was 1.0 (Example 26), the isocyanurate were extremely slight. The resins obtained in the examples of from 18 to 26 were all light-brown and clear resins having the substantially same excellent electrical properties as in Example 1. The mechanical properties of these resins were as shown in Table 4. The resins had excellent heat resistance.

EXAMPLE 27

One hundred grams of novolac type polyglycydylether (DEN 438, produced by Dow Chemical Co.), 144 g of MDI and 2.2 g of triethylamine were well mixed and the mixture was cured by the same procedure as in Example 1. The resulting cured product was a light-brown clear resin. An infrared absorption spectrum analysis was made on the resin. The analysis showed that there were the isocyanurate bonds and oxazolidone bonds in the resin as observed in the resin of Example 1. The cured product had a weight loss starting temperature of 400° C in a nitrogen atmosphere.

Further, said cured product has the same excellent electrical properties as that of Example 1. The mechanical properties are shown in Table 5.

Table 5

| | | |
|---|---|---|
| Initial value | Tensile strength* (kg/cm$^2$) | 529 |
| | Elongation* (%) | 4 |
| Properties after 20 days | Tensile strength* (kg/cm$^2$) | 500 |
| | Elongation* (%) | 3 |

Table 4

| | Example | 18 | 19 | 20 | 21 | 22 | 23 | 24 | 25 | 26 |
|---|---|---|---|---|---|---|---|---|---|---|
| Composition | DER 332 | 100 | 100 | 100 | 100 | 100 | 100 | 100 | 100 | 100 |
| | MDI | 104 (1.5) | 138 (2.0) | 174 (2.5) | 208 (3.0) | 243 (3.5) | 277 (4.0) | 347 (5.0) | 416 (6.0) | 69 (1.0) |
| | N-methylmorpholine | 0.40 | 0.48 | 0.54 | 0.062 | 0.68 | 0.76 | 0.9 | 1.04 | 0.34 |
| Properties of cured products | Initial value Tensile strength* (kg/cm$^2$) | 65 | 300 | 452 | 545 | 607 | 650 | 692 | 701 | 17 |
| | Elongation* (%) | 22 | 5 | 5 | 5 | 5 | 5 | 4 | 3 | 23 |
| | Properties after 20 days deterioration at 240° C Tensile strength* (kg/cm$^2$) | 17 | 280 | 430 | 505 | 588 | 595 | 610 | 623 | 0 |
| | Elongation* (%) | 15 | 4 | 4 | 3 | 3 | 3 | 4 | 2 | 0 |
| | Loss of weight (%) measured at an ordinary temperature | 4.5 | 3.8 | 3.6 | 3.6 | 3.4 | 3.5 | 3.3 | 3.2 | 3.5 |

The numeral in parenthesis is an equivalent ratio of MDI/DER 332.
*measurement made at 225° C.

As shown in Example 26, when the equivalent ratio of isocyanate group/epoxy group was 1.0, the resin had low tensile strength and great heat deterioration. When the resin was heated at 240° C for 20 days, the tensile strength of the resin became zero, so that any satisfactory product could not be obtained. On the contrary, when the equivalent ratio of isocyanate group/epoxy group was 1.5 or more, a high temperature strength and heat resistance rapidly became good, as shown in Examples of from 18 to 25. It was found how excellent the products of the present invention were. However, if the equivalent ratio of isocyanate group/epoxy group exceeded 5 (for example, Example 25, the resin became brittle at an ordinary temperature. Therefore, it will be seen that a desirable equivalent ratio is 5 or less. Particularly when excellent mechanical properties are required, a desirable ratio is within a range of 2 to 3.5.

| deterioration at 240° C | Loss of weight**(%) | 3.2 |
|---|---|---|

*measurement made at 225° C
**measured at an ordinary temperature

EXAMPLE 28

One hundred grams of alicyclic epoxy resin (Ch-221 produced by Chisso Corporation; epoxy equivalent: 76 and viscosity: 8 c.p.), 327 g of MDI and 0.95 g of triethylamine were well mixed together, and the mixture was cured by the same procedure as in Example 1. The resulting crude product was a light-brown clear resin. An infrared absorption spectrum analysis showed that there were the isocyanurate bonds and oxazolidone bonds in the resin as observed in the resin of Example 1. The cured product had a weight loss starting temperature of 385° C in a nitrogen atmosphere.

Further, said cured product had the same electrical proparaties as those of Example 1. The mechanical properties are shown in Table 6.

Table 6

| | | |
|---|---|---|
| Initial value | Tensile strength* (kg/cm$^2$) | 482 |
| | Elongation* (%) | 5 |
| Properties after 20 days deterioration at 240° C | Tensile strength* (kg/cm$^2$) | 460 |
| | Elongation* (%) | 4 |
| | Loss of weight (%) (measured at an ordinary room temperature) | 2.8 |

*measurement made at 225° C

EXAMPLE 29

One hundred grams of the same novolac type polyglycydylether as used in Example 27, 120 g of tolylenediisocyanate (80% of 2, 4 substitution product and 20% of 2, 6 substitution product) and 0.22 g of triethylamine were well mixed together and the mixture was cured by the same procedure as in Example 1. The resulting cured product was a light-brown clear resin. An infrared absorption spectrum analysis showed that there were the isocyanurate bonds and oxazolidone bonds in the resin as observed in the resin of Example 1. The cured product had a weight loss starting temperature of 375° C in a nitrogen atmosphere.

Further, said cured product had the same electrical properties as in Example 1. The mechanical properties are shown in Table 7.

Table 7

| | | |
|---|---|---|
| Initial value | Tensile strength* (kg/cm$^2$) | 471 |
| | Elongation* (%) | 5.0 |
| Properties after 20 days deterioration of 240° C | Tensile strength* (kg/cm$^2$) | 299 |
| | Elongation* (%) | 2.0 |
| | Loss of weight (%) (measured at an ordinary room temperature) | 4.2 |

*measurement made at 225° C

EXAMPLE 30

Eighty grames of the same diglycidylether of bisphenol A as used in Example 1, 20 g of diglycydylether of bromo bisphonel A (DER 542 produced by Dow Chemical Co. in the United States; epoxy equivalent of 370, a bromine content of 46% and a softening point of 55° C), 359 g of MDI and 2.3 g of N-methylmorpholine were well mixed together and the mixture was cured by the same procedure as in Example 1. The resulting cured product was a light-brown clear resin. An infrared absorption spectrum analysis showed that there were the isocyanurate bonds and the oxazolidone bonds.

The aforesaid resin was tested in conformity with the UL Standard 492. The test showed that the mean flame-extinguishing time was 1 second, that is to say, the flame retardation degree was SE-O. It will be seen that the resin has excellent flame retardation properties. Epoxy resins generally have come to have better fire retardance as they have a higher bromine content, but deterioration takes place in the physical proparties. The resin of the present invention in itself is fireretarding. It has less bromine content. Accordingly, the resin of the present invention does not have to contain so large amount of bromine. Hence, no deterioration is caused in the physical properties of the resin. In comparison with the ordinary epoxy resins, an equal fire retardance can be obtained in a bromine content of ⅓ to ¼.

EXAMPLE 31

One hundred grams of the same diglycydylether of bisphenol A as used in Example 1, 400 g of MDI in which isocyanic radicals were masked with cresol (MS 50 produced by Japan Polyurethane Co., Ltd.), 400 g of cresol, 400 g of solventnaphtha and 4 g of 2-phenylimidazole were mixed together. A silicon steel plate was coated with the mixture and heated at 350° C for four minutes to obtain a film.

The resulting film had a weight loss starting temperature of 382° C in a nitrogen atmosphere. Further, in the pencil hardness test to examine a strength of the film, the film was scratched with a pencil of 9H or more, but it was not broken. Further, the film had a volume resistivity of 3.6 × 10$^{16}$ Ω.cm, a friction coefficient of 0.34, a resistance between layers of ∞ in the case of lamination, a weight loss of 0.3% after 300 hours heating at 200° C and a water absorption of 0.001% after 20-days standing at a relative humidity of 70%. The resulting product is effectively used as a core insulating varnish for the electric devices such as rotating machines and transformers.

EXAMPLE 32

One hundred grams of cresol novalac type epoxy resin (ECN 1273 produced by Ciba A.G.; epoxy equivalent of 225) were dissolved in 122 g of toluene. The solution was admixed with a solution containing 83.3 g of MDI and 1.2 g of 2-phenylimidazole dissolved in 7 g of methyl ethyl ketone to make a varnish.

The gelation time of said varnish was measured on a brass plate heated at 160° C. The measurement showed that the varnish gelled in about 3 minutes 40 seconds. A glass cloth was impregnated in said varnish. After impregnation, the glass cloth was sufficiently dried up at 120° C to make a varnished cloth. Subsequently, a varnished cloth sheet of 200 mm × 200 mm. was made. And 30 sheets of the varnished cloth were piled up. The piled cloths were pressed at 160° C under a pressure of 80 kg/cm$^2$ for an hour to obtain a yellow translucent laminated board with the thickness of about 5 mm.

The resulting laminated board was cut to the size of 10 mm × 100 mm, and a measurement of the flexural strength at 180° C was made on the laminated board. The laminated board was found to have excellent characteristics. That is, it has a flexural strength of 43 kg/cm$^2$, a distortion of 2% and a modulus of elasticity in flexure of 2.3 × 10$^5$ kg/mm$^2$. It had also a flexural strength of 80 kg/mm$^2$ at a room temperature.

The laminated board composed of the conventional epoxy resin had a flexural strength of 60 kg/mm$^2$ or less at a room temperature and most of the boards softened at 180° C, showing a flexural strength of 30 kg/mm$^2$ at the highest.

EXAMPLE 33

One hundred grams of the same cresol novolac type epoxy resin as used in Example 32, 150 g of naphthalene-1,5-diisocyanate, 1 g of 2-heptadecylimidazole and 1 g of silica powder were mixed and kneaded at 80° to 100° C for 10 minutes by means of a kneader. After kneading, the mixture was minutely pulverized so that the grain could pass through 60 mesh.

The resulting resin composition was cured at 160° C on a steel plate under a pressure applied for an hour. A measurement of an Erichsen value (½ inch) and an impact resistance value (duPont 1 kg - ½ inch) was made on the resulting cured product of about 350 μ in film thickness. The measurement showed that the Erichsen value was 3 mm at 20° C and 180° C, respectively, and the impact resistance value was 5 cm at 20° C and 4 cm at 180° C. It was seen that the cured product had more excellent impact resistance at 180° C than epoxy resin.

EXAMPLE 34

One hundred grams of the same diglycidylether of bisphenol A as used in Example 1, 200 g of a liquid modified MDI (SUMIDUL CD produced by Sumitomo Bayer Urethane Company of Japan; a viscosity of 100 c.p. at 25° C) and 1 g of 1-cyanoethyl-2-phenylimidazole were mixed together to obtain a composition with a viscosity of 3 poises at 20° C.

A glass fiber was impregnated with said composition. The impregnated glass fiber was cured at 120° C for 2 hours and further at 150° C for 15 hours to make filament windings. A measurement of the flexural strength and the chemical resistance of the filament windings was made on the resulting filament windings. The measurement results are shown in Table 8. The chemical resistance was measured by the respective immersion test of a 180-days immersion in a 50% sulfuric acid at 130° C and a 180-days immersion in an aqueous solution of 10% NaOH at 95° C. For comparison, a test of the flexural strength and the chemical resistance was made on the filament windings composed of the conventional epoxy resin, too.

Table 8

|  | Flexural strength (kg/mm$^2$) | | Chemical resistance | |
| --- | --- | --- | --- | --- |
|  | 20° C | 160° C | 50 % H$_2$SO$_4$ | 10 % NaOH |
| Example 34 | 20–22 | 15–16 | Little or No abnormalities | Little or No abnormalities |
| Conventional polyester resin | 18–19 | 3–7 | Erosion decomposition | Erosion decomposition |

EXAMPLE 35

One hundred grams of the same cresol novolac type epoxy resin as used in Example 32, 120 g. of naphthalene-1,5-diisocyanate, 2 g of 1-triazinoethyl-2-undecylimidazole, 2 g of stearic acid, 2 g of Hochist Wax E, 0.4 g of a silane type coupling agent (KBM-303 produced by Shinetsu Chemical Co., Ltd.) and 350 g of molton quartz glass powder were well mixed together and sufficiently kneaded at 80° to 100° C with a kneaker. After kneading, the mixture was pulverized so as to enable it to pass through 60 mesh.

Said powder was molded at 150° C under a pressure 7.03 kg/cm$^2$ for 5 minutes. Further, the molded product was post-cured at 180° C for 15 hours. The characteristics of molded product are shown in Table 9.

Table 9

| Coefficient of thermal expansion ($\times 10^{-5}$) | | | 2.2 |
| --- | --- | --- | --- |
| Glass transition point (° C) | | | 200 or more |
| Flexural strength (kg/cm$^2$) | | 180° C | 615 |
| Distortion (%) | | 180° C | 0.9 |
| tan δ (%) | | 1 MHZ | 0.93 |
| ε | | 1 MHZ | 3.4 |
| ρ (Ω-cm) | | | 8.8 × 10$^{15}$ |
| Properties after 100 hour steaming was conducted at 120° C under | tan δ (%) | 1 MHZ | 2.1 |
| | ε | 1 MHZ | 3.7 |
| | ρ (Ω.cm) | | 1.1 × 10$^{14}$ |
| a steam pressure of 2 kg/cm$^2$ | water absorption (weight %) | | 0.48 |

What is claimed is:

1. A resin composition comprising 1 equivalent of an epoxide having 2 or more of vicinal epoxy groups, 2 equivalents or more of an organic polyisocyanate and 0.01 to 10% by weight of catalyst for forming isocyanurate rings and oxazolidone rings based on the total amount of the epoxide and isocyanate, whereby a thermosetting resin containing as a recurring unit 2 or more isocyanurate rings each being connected through an organic isocyanate residue and an oxazolidone ring connected at one side through an isocyanate residue to an organic isocyanurate and having at the other side an epoxy residue is provided by heating at a temperature higher than 80° C at which isocyanurate rings and oxazolidone rings are formed.

2. A resin composition comprising 1 equivalent of an epoxide having 2 or more of vicinal epoxy groups, 2 equivalent or more of an organic diisocyanate and 0.01 to 10% by weight of a catalyst for forming isocyanurate rings and oxazolidone rings based on the total amount of the epoxide and isocyanate, whereby a thermosetting resin containing as a recurring unit 2 or more isocyanurate rings each being connected through an organic isocyanate residue and an oxazolidone ring connected at one side through an organic isocyanate residue to an isocyanurate ring and having at the other side an epoxy residue is provided by heating at a temperature higher than 80° C at which isocyanurate rings and oxazolidone rings are formed.

3. The resin composition as defined in claim 1, wherein the epoxide is at least one member selected from the group consisting of bifunctional epoxides and trifunctional epoxides.

4. The resin composition as defined in claim 1, wherein the epoxide is at least one member selects from the group consisting of diglycidylether of bisphenol A and polyglycidylether of phenol-formaldehyde novolac.

5. The resin composition as defined in claim 1, wherein the polyisocyanate is at least one member selected from the group consisting of organic diisocyanates.

6. The resin composition as defined in claim 1, wherein the polyisocyanate is at least one member delected from the group consisting of 4,4'-diphenylmethane diisocyanate, 2,4-toluene diisocyanate, 2,6-toluene diisocyanate and naphthalene-1,5-diisocyanate.

7. The resin composition as defined in claim 1, wherein the catalyst is at least one member selected from the group consisting of tertiary amines, N-substituted morpholine derivatives having an alkyl, an alkaryl, an aralkyl, a cyano-alkylene or a morpholinoalkylene group as a substituent and imidazole derivatives having an alkyl, cyano-alkylene or triazino-alkylene group at any of 1-, 2- or 4-substitution positions.

8. The resin composition as defined in claim 1, wherein the catalyst is at least one member selected from the group consisting of N-methylmorpholine, 2-phenylimidazole, 1-cyanoethyl-2-phenylimidazole and 2,4-diamino-6-(2'-undecylimidazolyl-1'-)ethyl-s-triazine.

9. The resin composition as defined in claim 1, wherein 2 to 5 equivalents of the polyisocyanate per 1 equivalent of the epoxide are used.

10. The resin composition as defined in claim 1, wherein 2 to 3.5 equivalents of the polyisocyanate per 1 equivalent of the epoxide are used.

11. The resin composition as defined in claim 1, wherein the resin composition is admixed with an organic solvent which dissolves said composition.

12. A process for producing a thermosetting resin, which comprises heating a resin composition comprising 1 equivalent of an epoxide having 2 or more of vicinal epoxy groups, equivalents or more of an organic polyisocyanate and 0.01 to 10% by weight of a catalyst for forming an isocyanurate ring and oxazolidone ring based on the total amount of the epoxide and organic isocyanate to carry out a trimerization reaction of the isocyanate, and then allowing the trimerized isocyanate to react with the epoxide, whereby a thermosetting resin containing as a recurring unit 2 or more isocyanurate rings each being connected through an isocyanate residue and an oxazolidone ring connected at one side through an isocyanate residue ring and having at the other side an epoxy residue is provided by heating at a temperature greater than 80° C at which isocyanurate rings and oxazolidone rings are formed.

13. A process for producing a thermosetting resin which comprises heating a resin composition comprising 1 equivalent of an epoxide having 2 or more of vicinal epoxy groups, 2 equivalents or more of an organic diisocyanate and 0.01 to 10% by weight of a catalyst for forming an isocyanurate ring and oxazolidone ring based on the total amount of the epoxide and isocyanate to carry out a trimerization reaction of the isocyanate, and then allowing the trimerized isocyanate to react with the epoxide, whereby a thermosetting resin containing as a recurring unit 2 or more isocyanurate rings each being connected through an isocyanate residue and an oxazolidone ring connected at one side through an isocyanate residue to an isocyanurate ring and having at the other side an epoxy residue is provided by heating at a temperature higher than 80° C at which isocyanurate rings and oxazolidone rings are formed.

14. The process according to claim 13, wherein the epoxide is at least one member selected from the group consisting of bifunctional epoxides and trifunctional epoxides.

15. The process according to claim 13, wherein the epoxide is at least one member selected from the group consisting of diglycidylether of bisphenol A and polyglycidylether of phenol-formaldehyde novolac.

16. The process according to claim 13, wherein the polyisocyanate is at least one member selected from the group consisting of diisocyanates and triisocyanates.

17. The process according to claim 13, wherein the polyisocyanate is at least one member selected from the group consisting of 4,4'-diphenylmethane diisocyanate, 2,4-toluene diisocyanate, 2,6-toluene diisocyanate and naphthalene-1,5-diisocyanate.

18. The process according to claim 13, wherein the catalyst is at least one member selected from the group consisting of teriary amines, N-substituted morpholine derivatives having an alkyl, an alkaryl, an aralkyl, a cyano-alkylene, or a morpholino-alkylene group as a substituent and imidazole derivatives having an alkyl, cyano-alkylene or triazino-alkylene group at any of 1-, 2-, or 4-substitution positions.

19. The process according to claim 13, wherein the catalyst is at least one member selected from the group consisting of N-methylmorpholine, 2-phenylimidazole, 1-cyanoethyl-2-phenylimidazole and 2,4-diamino-6-(2'-undecylimidazolyl-1'-)ethyl-s-triazine.

20. The process according to claim 13, wherein 2 to 5 equivalents of the polyisocyanate per 1 equivalent of the epoxide having 2 or more of vicinal epoxy groups are used.

21. The process according to claim 13, wherein 2 to 3.5 equivalents of the polyisocyanate per 1 equivalent of the epoxide are used.

22. The process according to claim 13, wherein the heating is carried out at 80° to 250° C.

23. A process for producing a thermosetting resin which comprises (a) heating a resin composition comprising 1 equivalent of an epoxide having two or more vicinal epoxy groups, 2 equivalents or more of an organic polyisocyanate and 0.01 to 10% by weight of a catalyst for forming isocyanurate rings and oxazolidone rings based on the total amount of the epoxide and organic isocyanate at a temperature sufficient to carry out a trimerization reaction of the isocyanate so that isocyanurate bonds are predominantly formed, and (b) subsequently heating said composition at a temperature so that oxazolidone bonds are formed so that said resin is threedimensionally cross-linked.

24. The process of claim 23, wherein said resin composition consists essentially of said epoxide, said organic polyisocyanate and said catalyst.

25. The process of claim 24, wherein said composition consists of said epoxide, said organic polyisocyanate and said catalyst.

26. The process of claim 24, wherein said composition is heated to a temperature of about 130° C or lower for the formation of said isocyanurate rings.

27. The process of claim 26, wherein said composition is heated at a temperature of greater than 130° C for the formation of said oxazolidone rings.

28. The process of claim 23, wherein said composition is heated to a temperature of about 130° C or lower for the formation of said isocyanurate rings.

29. The process of claim 28, wherein said composition is heated at a temperature of greater than 130° C for the formation of said oxazolidone rings.

30. A resin produced by the process comprising (a) heating a resin composition comprising 1 equivalent of an epoxide having two or more vicinal epoxy groups, 2 equivalents or more of an organic polyisocyanate and 0.01 to 10% by weight of a catalyst for forming isocyanurate rings and oxazolidone rings based on the total amount of the epoxide and organic polyisocyanate at a temperature sufficient to carry out a trimerization reaction of the isocyanate so that isocyanurate bonds are predominantly formed, and (b) subsequently heating said composition at a temperature so that oxazolidone bonds are formed so that said resin is three-dimensionally cross-linked.

31. The resin of claim 30, wherein said composition consists essentially of said epoxide, said organic polyisocyanate and said catalyst.

32. The resin of claim 31, wherein said composition consists of said epoxide, said organic polyisocyanate and said catalyst.

33. The resin of claim 30, wherein said composition is heated to a temperature of about 130° C or lower for the formation of said isocyanurate rings.

34. The resin of claim 33, wherein said composition is thereafter heated at a temperature of greater than 130° C for the formation of said oxazolidone rings.

35. The resin of claim 31, wherein said composition is heated to a temperature of about 130° C or lower for the formation of said isocyanurate rings.

36. The resin of claim 35, wherein said composition is thereafter heated at a temperature of greater than 130° C for the formation of said oxazolidone rings.

37. A resin composition capable of forming a thermoset resin containing as a recurring unit 2 or more isocyanurate rings each being connected through an organic isocyanate residue and an oxazolidone ring connected at one side through an organic isocyanate residue through an isocyanurate ring and having at the other side an epoxy residue by heating at a temperature higher than 80° C at which isocyanurate rings and oxazolidone rings are formed, said resin composition consisting essentially of 1 equivalent of an epoxide having 2 or more vicinal epoxy groups, 2 equivalents or more of an organic polyisocyanate and 0.01 to 10% by weight of a catalyst for forming isocyanurate rings and oxazolidone rings based on the total amount of the epoxide and isocyanate.

38. The composition of claim 37, wherein said polyisocyanate is a diisocyanate.

39. The composition of claim 37, wherein the epoxide is at least one member selected from the group consisting of bifunctional epoxides and trifunctional epoxides.

40. The composition of claim 37, wherein the epoxide is at least one member selected from the group consisting of diglycidylether is bisphenol A and polyglycidylether of phenolformaldehyde novolac.

41. The composition of claim 37, wherein the organic polyisocyanate is at least one member selected from the group consisting of organic diisocyanates.

42. The composition of claim 37, wherein the polyfunctional organic isocyanate is at least one member selected from the group consisting of 4,4'-diphenylmethane diisocyanate, 2,4-toluene diisocyanate, 2,6-toluene diisocyanate and naphthalene-1,5-diisocyanate.

43. The composition of claim 37, wherein the catalyst is at least one member selected from the group consisting of tertiary amines, N-substituted morpholine derivatives having an alkyl, an alkaryl, an aralkyl, a cyanoalkylene, or a morpholino-alkylene group as a substituent and imidazole derivatives having an alkyl, cyanoalkylene or triazino-alkylene group at any of 1-, 2- or 4-substitution positions.

44. The composition of claim 37, wherein the catalyst is at least one member selected from the group consisting of N-methylmorpholine, 2-phenylimidazole, 1-cyanoethyl-2-phenylimidazole and 2,4-diamino-6-(2'-undecylimidazolyl-1'-)ethyl-s-triazine.

45. The composition of claim 37, wherein 2 to 5 equivalents of the organic polyisocyanate per 1 equivalent of the epoxide are used.

46. The composition of claim 37, wherein 2 to 3.5 equivalents of the organic polyisocyanate per 1 equivalent of the epoxide are used.

47. The composition of claim 37, wherein the resin composition is admixed with an organic solvent which dissolves said composition.

48. The composition of claim 37, wherein said composition consists of said epoxide, said organic polyisocyanate and said catalyst.

* * * * *